(12) United States Patent
Craig

(10) Patent No.: US 10,100,735 B2
(45) Date of Patent: Oct. 16, 2018

(54) LOW LOSS OIL ACCUMULATOR ASSEMBLY

(71) Applicant: United Technologies Corporation, Farmington, CT (US)

(72) Inventor: Colin D. Craig, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/801,576

(22) Filed: Nov. 2, 2017

(65) Prior Publication Data

US 2018/0058325 A1 Mar. 1, 2018

Related U.S. Application Data

(62) Division of application No. 14/494,081, filed on Sep. 23, 2014, now Pat. No. 9,835,086.

(60) Provisional application No. 61/888,398, filed on Oct. 8, 2013.

(51) Int. Cl.
*F02C 7/06* (2006.01)

(52) U.S. Cl.
CPC .......... *F02C 7/06* (2013.01); *F05D 2260/602* (2013.01)

(58) Field of Classification Search
CPC ............................ F02C 7/06; F05D 2260/602
See application file for complete search history.

(56) References Cited

U.S. PATENT DOCUMENTS

| 5,471,966 A * | 12/1995 | Feuling ................. F01M 13/04 123/572 |
| 8,020,665 B2 * | 9/2011 | Sheridan ................ F01D 25/18 184/6.12 |
| 8,292,036 B2 * | 10/2012 | Nishida ............... F16H 57/0402 184/6.2 |
| 2008/0116009 A1 * | 5/2008 | Sheridan ................ F01D 25/18 184/6.4 |
| 2008/0116010 A1 * | 5/2008 | Portlock ................ F01D 25/18 184/6.12 |

(Continued)

OTHER PUBLICATIONS

USPTO; Restriction Requirement Office Action dated Jul. 20, 2016 in U.S. Appl. No. 14/494,081.

(Continued)

*Primary Examiner* — Michael A Riegelman
(74) *Attorney, Agent, or Firm* — Snell & Wilmer, L.L.P.

(57) ABSTRACT

An oil accumulator assembly may comprise a scavenge tube including an aperture defined by a break in the scavenge tube and/or an annular cylindrical structure concentrically situated about the scavenge tube. The aperture may be configured to receive oil flowing through the scavenge tube, and the annular cylindrical structure may be configured to accumulate oil flowing through the aperture. The oil accumulator assembly may further comprise a drainage outlet disposed in the annular cylindrical structure. Oil accumulated within the annular cylindrical structure may drain through the drainage outlet in response to an engine being shut down. The oil accumulated within the annular cylindrical structure may fill a portion of the scavenge tube situated within an engine fan case to prevent coking within the scavenge tube.

5 Claims, 4 Drawing Sheets

(56) References Cited

U.S. PATENT DOCUMENTS

2011/0297485 A1* 12/2011 Sheridan ................. F01D 25/18
                                                              184/6.12
2014/0076661 A1*  3/2014 Xu .......................... F16N 17/06
                                                              184/6
2015/0096839 A1   4/2015 Craig

OTHER PUBLICATIONS

USPTO; Pre-Interview First Office Action dated Sep. 27, 2016 in U.S. Appl. No. 14/494,081.
USPTO; First Action Interview Office Action dated Nov. 21, 2016 in U.S. Appl. No. 14/494,081.
USPTO; Final Office Action dated Feb. 16, 2017 in U.S. Appl. No. 14/494,081.
USPTO; Advisory Action dated May 2, 2017 in U.S. Appl. No. 14/494,081.
USPTO; Non-Final Office Action dated Jun. 16, 2017 in U.S. Appl. No. 14/494,081.
USPTO; Notice of Allowance dated Sep. 28, 2017 in U.S. Appl. No. 14/494,081.

* cited by examiner

LOW LOSS OIL ACCUMULATOR ASSEMBLY

CROSS REFERENCE TO RELATED APPLICATIONS

This application is a divisional of, and claims priority to, U.S. application Ser. No. 14/494,081, filed Sep. 23, 2014 and entitled "LOW LOSS OIL ACCUMULATOR ASSEMBLY." The '081 Application claims the benefit of U.S. Provisional Application No. 61/888,398, filed Oct. 8, 2013 and entitled "LOW LOSS OIL ACCUMULATOR ASSEMBLY." The '081 Application and the '398 Application are hereby incorporated by reference in their entirety.

FIELD

The present disclosure relates to jet aircraft propulsion systems, and more particularly, to a low loss oil accumulator for use with such systems.

BACKGROUND

Jet aircraft propulsion systems, such as those that power modern commercial and military aircraft, include a variety of rotating components, and these components are typically lubricated by one or more types of oil. Lubricating oil may be supplied to each component by an oil supply tube. Similarly, lubricating oil may be recovered or "scavenged" by an oil scavenge tube.

SUMMARY

In an embodiment, the oil accumulator assembly may comprise a scavenge tube including an aperture defined by a break in the scavenge tube and/or an annular cylindrical structure (and/or any other suitably shaped structure, such as an ovaloid or elliptical structure) concentrically situated about the scavenge tube. The aperture may be configured to receive oil flowing through the scavenge tube, and the annular cylindrical structure may be configured to accumulate oil flowing through the aperture. The oil accumulator assembly may further comprise a drainage outlet disposed in the annular cylindrical structure. Oil accumulated within the annular cylindrical structure may drain through the drainage outlet in response to an engine being shut down. The oil accumulated within the annular cylindrical structure may fill a portion of the scavenge tube situated within an engine fan case to prevent coking within the scavenge tube. The annular cylindrical structure may comprise a first radially extending surface defining a first end cap and a second radially extending surface defining a second end cap. The aperture may be disposed within the annular cylindrical structure, such as between the first end cap and the second end cap. The scavenge tube may extend through the first end cap, terminate in the aperture, and resume its course within the annular cylindrical structure to extend through the second end cap. The aperture may be disposed in the scavenge tube such that air and oil are permitted to fill the annular cylindrical structure. The oil accumulated in the annular cylindrical structure may not substantially interfere with the oil flowing through the scavenge tube.

In an additional embodiment, the oil accumulator assembly may comprise a scavenge tube, which may comprise a permeable portion including a plurality of perforations, and/or an annular cylindrical structure concentrically situated about the permeable portion of the scavenge tube. The permeable portion may be permeable to oil flowing through the scavenge tube, and the annular cylindrical structure may configured to accumulate oil passing through the permeable portion. The oil accumulated within the annular cylindrical structure may drain through the permeable portion to return to the scavenge tube in response to an engine being shut down. The oil accumulated within the annular cylindrical structure may fill a portion of the scavenge tube situated within an engine fan case to prevent coking within the scavenge tube. The annular cylindrical structure may comprise a first radially extending surface defining a first end cap and a second radially extending surface defining a second end cap. The permeable portion may be disposed within the annular cylindrical structure, such as between the first end cap and the second end cap. The oil accumulated in the annular cylindrical structure may not substantially interfere with the oil flowing through the scavenge tube.

In yet another embodiment, the aircraft propulsion system may comprise a scavenge tube including an aperture defined by a break in the scavenge tube and/or an annular cylindrical structure concentrically situated about the scavenge tube. The aperture may be configured to receive oil flowing through the scavenge tube, and/or the annular cylindrical structure may be configured to accumulate oil flowing through the aperture. A drainage outlet may be disposed in the annular cylindrical structure. The oil accumulated within the annular cylindrical structure may drain through the drainage outlet in response to an engine being shut down. The oil accumulated within the annular cylindrical structure may fill a portion of the scavenge tube situated within an engine fan case to prevent coking within the scavenge tube. The annular cylindrical structure may comprise a first radially extending surface defining a first end cap and a second radially extending surface defining a second end cap.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Figure 1:
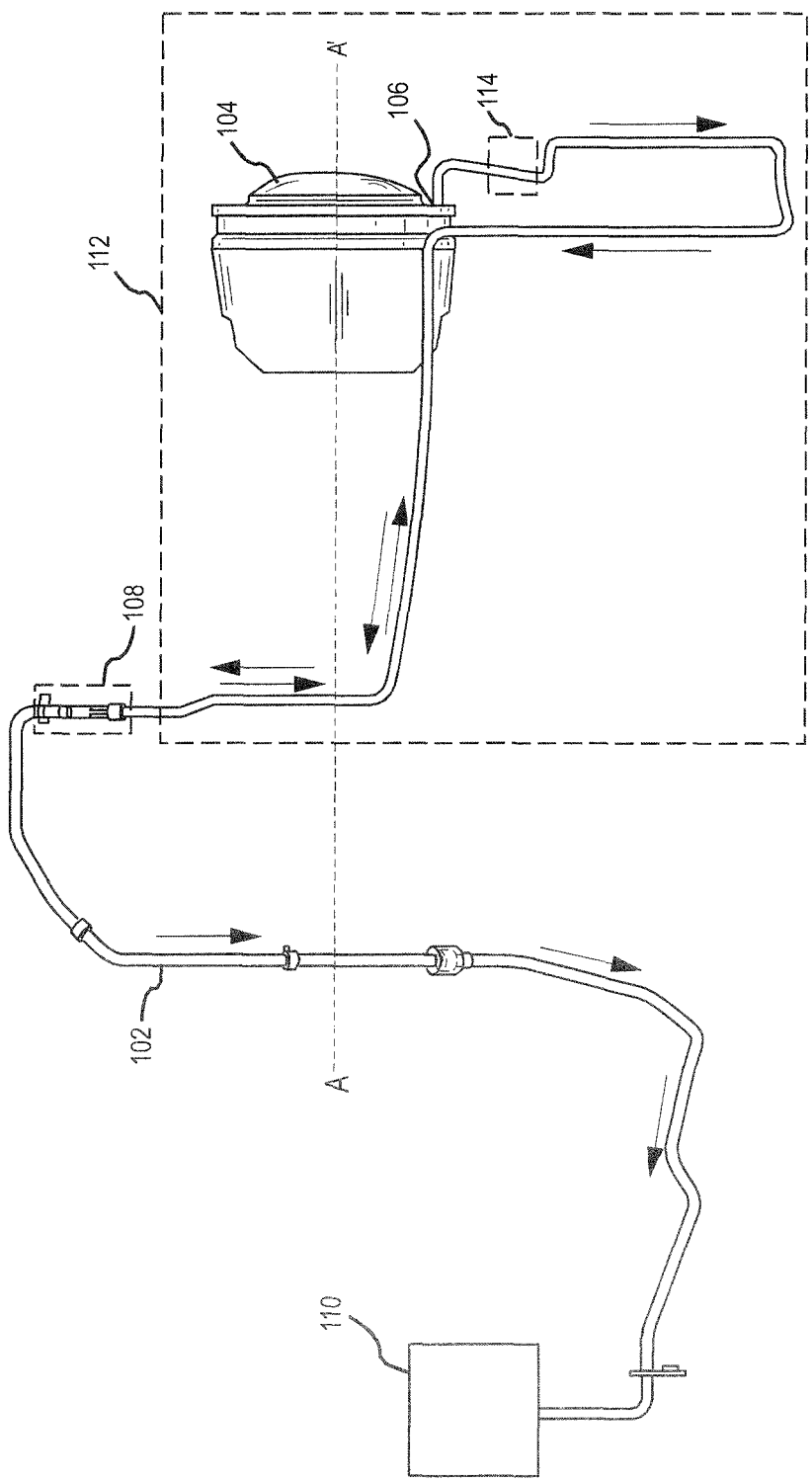
FIG. 1 illustrates, in accordance with various embodiments, a perspective view of a bearing compartment scavenge line.

With reference to FIG. 1, an oil scavenge tube 102 is shown coupled to a bearing compartment 104. The scavenge tube 102 and bearing compartment may be at least partially situated within a gas turbine engine compartment, which may be surrounded by a housing or fan case 112. The gas turbine engine, although not shown, may extend axially along a centerline or axis, marked in FIG. 1 as the axis A-A'. The bearing compartment 104 may be situated axially about the axis A-A' as well. For reference, A is in the forward direction of the gas turbine engine, and A' is in the aft direction of the gas turbine engine, however, the scavenge tube 102, bearing compartment 104, and other components may be in any orientation or configuration, as would be understood by those of ordinary skill in the art.

The scavenge tube 102 may, in addition, be coupled to the bearing compartment 104 at a drainage outlet 106 of the bearing compartment 104. Oil may enter the bearing compartment 104 to lubricate the components rotating within the bearing compartment 104 and exit the bearing compartment 104 at the drainage outlet 106. Oil supplied to the bearing compartment 104 may also cool the static walls of the bearing compartment 104 as well as the rotating components.

During operation of the gas turbine engine, an oil pump 114 coupled to the scavenge tube 102 may draw oil through the scavenge tube 102 as it exits the drainage outlet 106. Thus, as shown, oil may be drawn from the bearing compartment 104, through the scavenge tube 102, and into a gearbox and/or a reservoir 110 for recycling.

The scavenge tube 102 may be coupled to an oil accumulator assembly 108 at a location along the scavenge tube 102. The oil accumulator assembly 108 may, in various embodiments, be coupled to the scavenge tube 102 near the engine housing or fan case 112, but may also be located anywhere along the scavenge tube 102.

During operation of the gas turbine engine, temperatures within the gas turbine engine fan case may surpass 1000 degrees Fahrenheit (~537.7° C.). When the gas turbine engine is shut down, temperatures may remain quite high for some time (in excess of 400 degrees Fahrenheit (~204.4° C.)). In addition, during shutdown, the oil pump 114 may be powered off and therefore cease to draw oil through the scavenge tube 102. The scavenge tube 102 may thus be emptied (or substantially emptied) of oil during an engine shutdown procedure. Oil residue may, however, remain after engine shutdown to coat the interior surface of the scavenge tube 102. This residue may oxidize in the presence of heat and oxygen to form a layer of "coke," which may comprise a varnish like layer and/or a layer of deposited carbon.

It is therefore desirable to include an accumulator assembly 108 in, on, or in-line with the scavenge tube 102. The accumulator assembly 108 may accumulate oil during operation of the engine and, during shutdown, permit the accumulated oil to drain back into the portions of the scavenge tube 102 in danger of coking (e.g., those portions situated within the engine fan case). The oil returning to the scavenge tube 102 from the accumulator assembly 108 may fill the scavenge tube 102 to remove oxygen in the scavenge tube 102 and, thus, to prevent or impede the coking process within the tube.

At high altitude, the pressure generated by the oil pump 114 may be reduced as a result of the reduced air pressure at altitude. The accumulator assembly 108 may contribute to a reduction in the pressure generated by the oil pump 114 (and therefore the effectiveness of the pump), because oil may percolate and/or circulate within the accumulator assembly as the pump draws oil through the scavenge tube 102. In other words, the oil percolating within the accumulator assembly may impede the flow of oil through the scavenge tube 102.

Figure 2A:
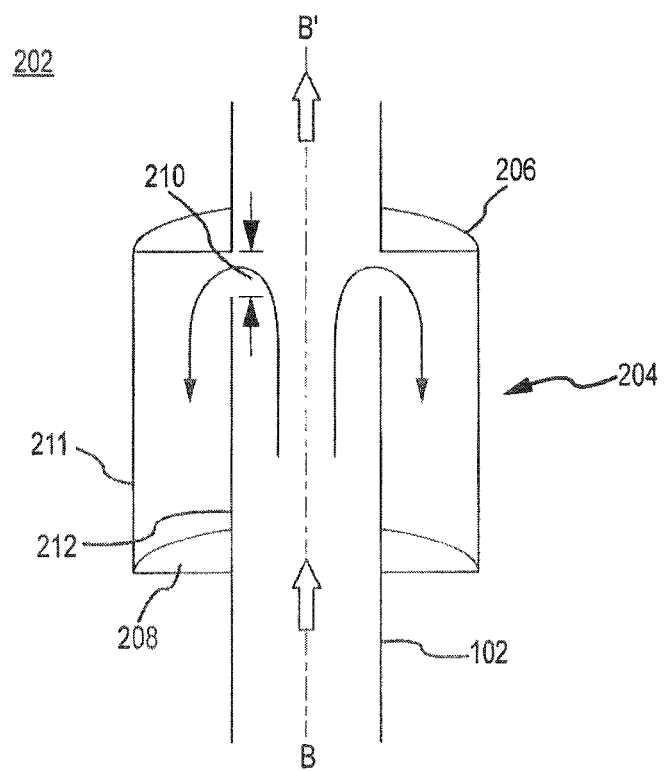
FIG. 2A illustrates, in accordance with various embodiments, a cross-sectional view of an oil accumulator.

Therefore, with reference to FIG. 2A, an accumulator assembly 202 which may reduce a pressure loss in the scavenge tube 102, according to an embodiment. The accumulator assembly 202 may comprise an annular cylindrical structure 204. In various embodiments, any suitably shaped structure may form the accumulator assembly 202. For example, the accumulator assembly 202 may comprise an ovaloid or elliptical structure. Likewise, the accumulator assembly 202 may comprise an ovaloid or elliptical shaped outer surface (e.g., a non-cylindrical outer surface), but a substantially cylindrical inner surface.

The annular cylindrical structure 204 may be substantially concentrically disposed about an exterior surface of the scavenge tube 102 substantially about the centerline or axis marked B-B', however, as will be understood by those of ordinary skill in the art, the annular cylindrical structure 204 is shown along the axis marked B-B' for purposes of illustration, and other orientations (e.g. off center, angled to the axis etc.) may be used in various embodiments. Thus, the annular cylindrical structure 204 may comprise an exterior axially extending surface 211 situated concentrically about an interior axially extending surface 212. The interior axially extending surface 212 may simply comprise an exterior surface of the scavenge tube 102. Further, in various embodiments, the surface 212 may be omitted, such that oil may simply percolate and/or circulate within the accumulator assembly.

The annular cylindrical structure 204 may further comprise a first radially extending surface 206 and a second radially extending surface 208. These surfaces may cap the annular cylindrical structure 204 at both of its axial ends to prevent oil from exiting at either end. Therefore, the first radially extending surface 206 may define a first end cap, and the second radially extending surface 208 may define a second end cap.

The scavenge tube 102 may further comprise an aperture or spillway 210. The aperture 210 may be defined by a break or opening in a wall of the scavenge tube 102 within the annular cylindrical structure 204. As a result, the interior surface 212 of the annular cylindrical structure (i.e., the exterior surface of the scavenge tube 102) may not be coextensive with the exterior axially extending surface 211 of the annular cylindrical structure 204. Rather, while the exterior axially extending surface 211 may contact both of the first radially extending surface 206 as well as the second radially extending surface 208, the interior surface 212 may contact the second radially extending surface 208 but may not contact the first radially extending surface 206. In an embodiment, the aperture 210 is actually one or more apertures between the interior surface 212 and the first radially extending surface 208 with at least one portion of the interior surface making contact with the first radially extending surface 208. The annular cylindrical structure 204 may therefore be in fluid communication, through the aperture 210, with the scavenge tube 102. In addition, in various embodiments, the interior surface 212 may not contact the first radially extending surface 206 and/or the second radially extending surface 208, and/or the interior surface 212 may only partially contact the first radially extending surface 206 and/or the second radially extending surface 208. In various embodiments, the aperture 210 may not be located on any of the external surfaces of the accumulator assembly 202 (e.g., surfaces 206, 208, and/or 211).

During operation, oil may flow within the scavenge tube 102 generally from B to B'. As the oil passes over the aperture 210, some of the oil may flow through the aperture 210 to fill the annular cylindrical structure 204 of the accumulator assembly 202. The oil retained within the annular cylindrical structure 204 may not substantially impede the flow of oil within the scavenge tube 102, however, because the accumulated oil may be separated from the oil flowing within the scavenge tube 102 by the interior surface 212 of the annular cylindrical structure 204. Oil may be allowed to drain from the annular cylindrical structure 204 through one or more drainage outlets, which may be variously disposed between the annular cylindrical structure 204 and the scavenge tube 202 (e.g., see FIG. 2B). For example, a drainage outlet may comprise, in various embodiments, an aperture or hole formed in a portion of the scavenge tube 202 that is situated within the annular cylindrical structure 204. Thus, as described herein, oil may drain out of the annular cylindrical structure 204 through the drainage hole and into the scavenge tube 202.

Figure 2B:
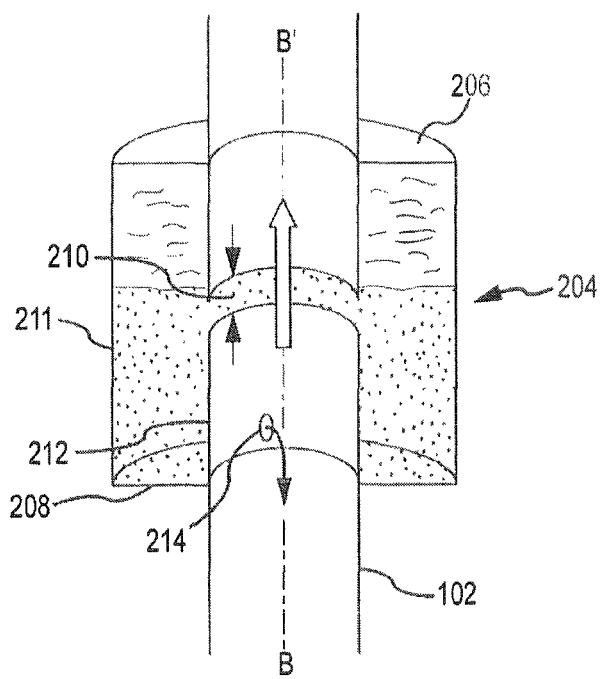
FIG. 2B illustrates, in accordance with various embodiments, a cross-sectional view of an oil accumulator.

With reference to FIG. 2B, as shown, the aperture 210 may be disposed between the annular cylindrical structure 204 and the scavenge tube 102 in a variety of locations. For example, the aperture 210 may disposed axially in the direction of B on the axis B-B' and/or axially in the direction of B' on the same axis. Depending upon the location of the aperture 210, as shown, the level of oil accumulated within the annular cylindrical structure 204 vary. An aperture 210 may be disposed such that a volume of accumulated oil is sufficient to fill (but not overfill) a portion of a scavenge tube 102 at risk of coking during engine shutdown. More particularly, as shown, the scavenge tube 102 may extend through the first radially extending surface 206, terminate in the aperture 210, and resume its course within the annular cylindrical structure 204 to extend through the second radially extending surface 208. In addition, as described above, oil may be allowed to drain from the annular cylindrical structure 204 through one or more drainage outlets 214, which may be variously disposed between the annular cylindrical structure and the scavenge tube 202.

Figure 3:
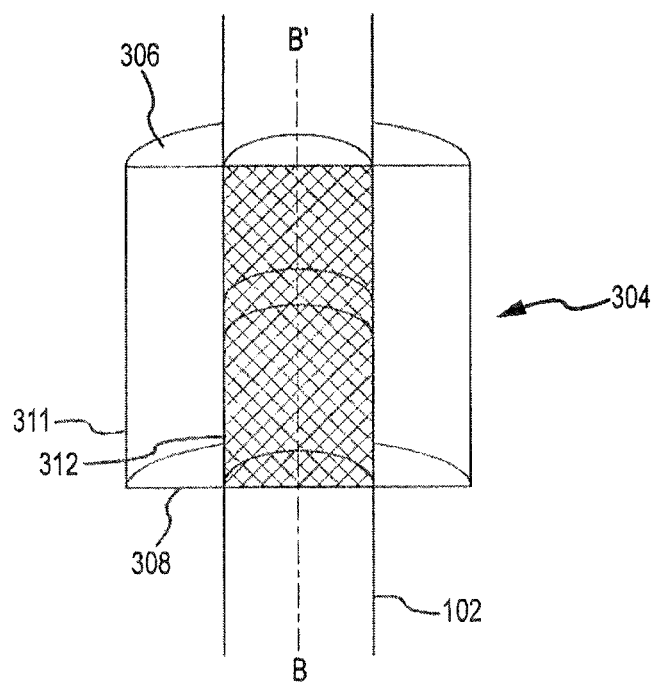
FIG. 3 illustrates, in accordance with various embodiments, a cross-sectional view of an oil accumulator.

With reference now to FIG. 3, an accumulator assembly 302 is shown. The accumulator assembly 302 may comprise an annular cylindrical structure 304 situated about the axis B-B', or otherwise as described above with regard to FIG. 2A. Like the accumulator assembly 202, the accumulator assembly may include a first surface 306 and a second surface 308, each of which may cap the annular cylindrical structure 304. In addition, as described above, the annular cylindrical structure 304 may comprise an interior surface 312 and an exterior surface 311, which may be situated concentrically about the interior surface 312. The interior surface 312 may comprise an exterior surface of the scavenge tube 102.

Further, as shown, the scavenge tube 102 may comprise a permeable portion having a plurality of perforations. The permeable portion may thus comprise a screen or sieve-like structure through which oil may pass as it flows within the scavenge tube 102 from B to B'. The accumulator assembly 302 may retain oil within the annular cylindrical structure 304 such that the accumulated oil does not substantially impede the flow of oil within the scavenge tube 102. Rather, the screened interior surface 312 may form a partition between the oil flowing in the scavenge tube 102 and the accumulated oil sufficient to reduce pressure losses resulting from percolation between the accumulated oil and the oil within the scavenge tube 102. During shutdown, oil may be allowed to drain from the annular cylindrical structure 304 through permeable portion and/or through one or more drainage holes between the annular cylindrical structure 304 and the scavenge line 302.

As oil drains from any of the annular cylindrical structures 202 and/or 302 described herein, the oil may return to the scavenge tube 102 to fill all or a portion of the scavenge tube 102 with oil while the engine is not running. In various embodiments, oil may drain from the annular cylindrical structures 202 and/or 302 to fill a portion of a scavenge tube 102 that may be subject to coking, such as a portion of the scavenge tube 102 situated within an engine fan case and/or a portion of the scavenge tube 102 that is subject to temperatures exceeding about 400 degrees Fahrenheit (204° C.) for a period of time after the engine has been shut down. In an embodiment more than one annular cylindrical structures 202 and/or 302, may be used in series on the scavenge tube 102 to accumulate a quantity of oil necessary to fill the relevant portions of the scavenge tube 102.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oil accumulator assembly comprising:
    a scavenge tube comprising a permeable portion, the scavenge tube configured to be permeable to oil flowing through the scavenge tube;
    an annular cylindrical structure concentrically situated about the permeable portion of the scavenge tube; and
    an oil pump configured to draw oil through the scavenge tube in a first axial flow direction,
    wherein the annular cylindrical structure is configured to accumulate oil passing through the permeable portion of the scavenge tube and, in response to the oil pump being shut down, drain the accumulated oil into the scavenge tube such that the accumulated oil flows through the scavenge tube in a second axial flow direction opposite the first axial flow direction.

2. The oil accumulator assembly of claim 1, wherein the annular cylindrical structure is configured to drain the accumulate oil to fill a portion of the scavenge tube situated within an engine fan case to prevent coking within the scavenge tube.

3. The oil accumulator assembly of claim 1, wherein the annular cylindrical structure comprises:
    a first radial surface extending radially from an exterior surface of the scavenge tube;
    a second radial surface extending radially from the exterior surface of the scavenge tube; and
    an axial surface extending axially between the first radial surface and the second radial surface.

4. The oil accumulator assembly of claim 3, wherein the permeable portion is disposed within the annular cylindrical structure, between the first radial surface and the second radial surface.

5. The oil accumulator assembly of claim 1, wherein the oil accumulated in the annular cylindrical structure does not substantially interfere with the oil flowing through the scavenge tube.

* * * * *